July 15, 1969   R. L. BUIST ET AL   3,455,442
MACHINE FOR SORTING ARTICLES
Filed Feb. 13, 1967   2 Sheets-Sheet 2

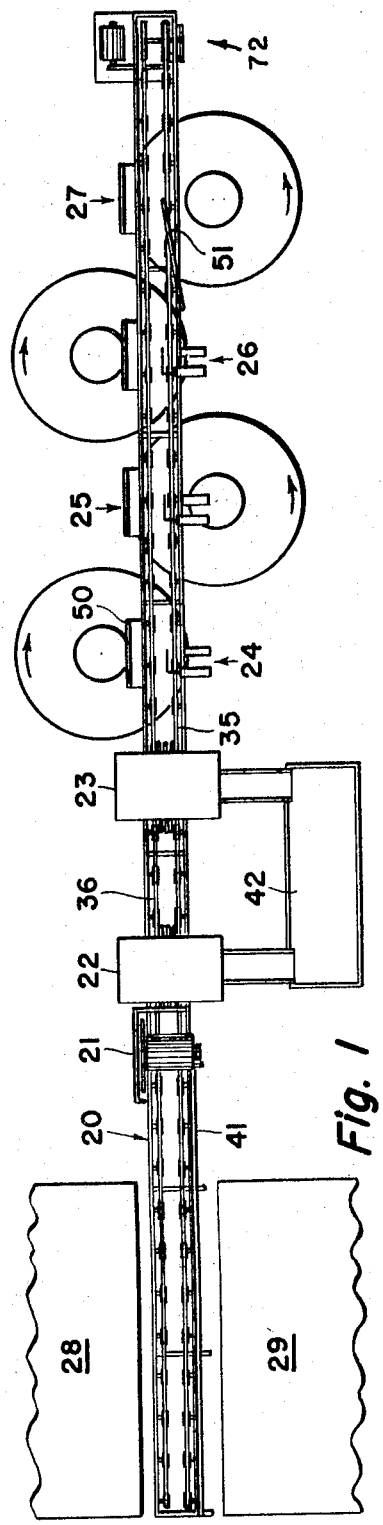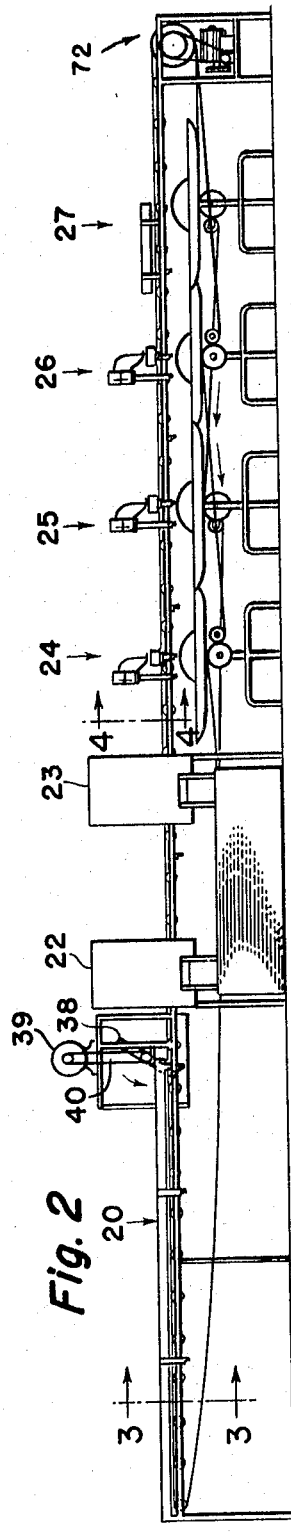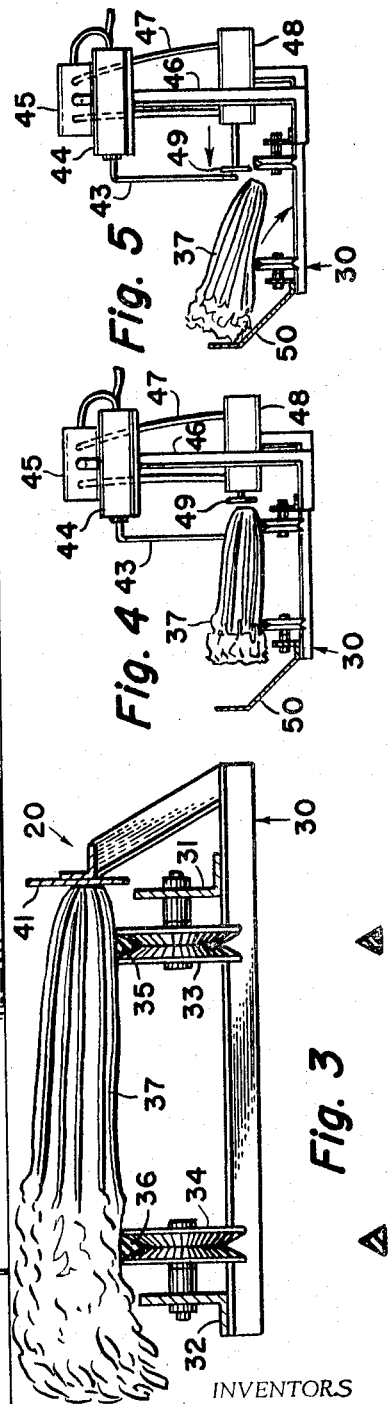

INVENTORS
Robert L. Buist
Ronald D. Bos
ATTORNEY

United States Patent Office 3,455,442
Patented July 15, 1969

3,455,442
MACHINE FOR SORTING ARTICLES
Robert L. Buist, Allendale, Mich. 49401, and Ronald D. Bos, 7391 Glendora Ave., Jenison, Mich. 49428
Filed Feb. 13, 1967, Ser. No. 615,403
Int. Cl. B07c 5/06
U.S. Cl. 209—74                              7 Claims

ABSTRACT OF THE DISCLOSURE

A conveyorized sorting machine supporing conveyed articles on spaced belts, with means for shifting the articles laterally at each sorting station in response to a size detector, the amount of shift being selected to cause the articles to fall between the belts.

---

This invention provides a machine for sorting celery plants to size, and accumulating the sorted plants to facilitate packing. Most celery has previously been sorted manually, for lack of an automatic machine sufficiently economical to be practical. To some extent, the economy of the machine provided by this invention is due to the arrangement for a common drive serving both the conveying and the accumulating system. Manual sorting has had the advantage of minimizing the bruising of the celery, and this must be done if good marketable quality is to be maintained. The machine provided by this invention provides the bruise-free operation characteristic of manual sorting, with the cost savings inherent in automation. Preferably, some conventional processing operations are included in the machine, such as cutting the plants to length, inspecting, and washing them. This results in a single unified operation taking the plants as they come from the field, and ultimately packaging them for the market.

The several features of the invention will be analyzed in detail through a discussion of the particular embodiments illustrated in the accompanying drawings. In the drawings.

FIGURE 1 is a schematic plan view of a machine embodying the preferred form of the present invention.

FIGURE 2 is a side elevation of the machine shown in FIGURE 1.

FIGURE 3 is a sectional elevation on an enlarged scale on the plane 3—3 of FIGURE 2.

FIGURE 4 is a sectional elevation on an enlarged scale (somewhat less than that of FIGURE 3) on the plane 4—4 of FIGURE 2.

FIGURE 5 is a view similar to FIGURE 4, showing an intermediate condition in the discharge of a sized celery plant.

Figure 6:
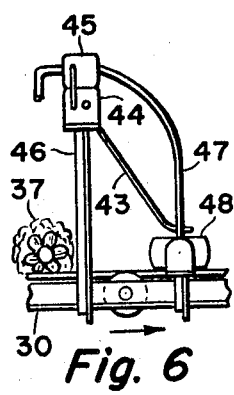
FIGURES 6 and 7 illustrate form of size detector.

The machine illustrated in the drawings includes the conveyor generally indicated at 20, which is arranged to move celery plants from the loading station at the left-hand extremity of FIGURES 1 and 2 through the cutting device 21, the successive washing stations 22 and 23, and through the sizing and accumulating stations 24–27. The loading station at the beginning of the conveyor is preferably surrounded by enough floor space so that a conventional trailer may be placed as shown at 28 or 29 for transfer of the celery plants onto the sorting and processing machine. These trailers are of a variety of designs, and are loaded in the celery fields as the plants are harvested.

The general structure of the conveyor 20 is best shown in FIGURE 3. A framework generally indicated at 30 is similar in appearance to the well-known "roller conveyor," and provides a pair of spaced rails 31 and 32 mounted on a suitable supporting structure. In place of the usual rollers, the rails 31 provide supports for a series of pulleys as shown at 33 and 34 which define the upper courses of the V-belts 35 and 36, respectively. These belts are horizontally spaced by a predetermined amount corresponding to the length of a celery plant, as shown at 37, after the plant has been "topped" by removal of a part of the leafy portion to render all the plants to a predetermined length. This operation is performed at the cutting station 21, which may include either a saw or a rotating knife positioned to swing in a plane somewhat to the left of the belt 36, as shown in FIGURE 3. Applicants have found it very practical to use a rotating blade of the type commonly found in a lawn mower, mounted as shown in FIGURE 2 so that the blade 38 is driven by the motor 39 through the belt 40. The direction of rotation should be as shown in FIGURE 2, so that there is a tendency for the rotating blade 38 to hold the celery down against the conveyor. The cutting of the celery to the proper length is facilitated by the presence of the fence 41 placed at a predetermined distance to the right of the supporting belt 35 over the length of a conveyor 20 at which the loading operation takes place. After the cutting operation has been completed, it is preferable that the celery be subjected to two successive washing stations, as shown at 22 and 23. These are essentially conventional housings within which sprays are directed at the plants passing along the conveyor, and it has been found more effective to perform the washing operations, or at least the final washing operation, after the plants have been cut to length. Drainage from the washing stations 22 and 23 may be accumulated in a tank as shown at 42, from which suitable pumping equipment (not shown) recirculates the water to at least the first spray station 22. The station 23 may, if desired, be provided with clean water.

Figure 7:
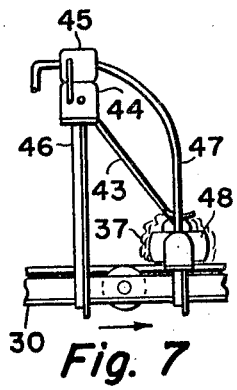

Plants of celery can be sorted according to weight through the use of standard conveyor-station weighing devices, but are normally sorted according to their size in diameter. The sorting stations 24–26 may be provided with detecting devices as shown either at FIGURES 6 and 7 or at FIGURES 8 and 9. In the FIGURES 6–7 arrangement, the detecting arm 43 is pivotally mounted on the switch box 44, which controls the solenoid valve 45. The switch and valve are conveniently mounted on a post 46, which may be considered as fixed with respect to the frame 30 of the conveyor system. The movement of a celery plant from left to right, as shown in FIGURES 6 and 7, will induce a counterclockwise rotation of the detecting arm 43. If the celery is of sufficient diameter, the arm 43 will rotate sufficiently far to actuate the switch 44, energizing the solenoid valve 45, and causing compressed air to be admitted through the conduit 47 to the air cylinder 48. This action is best shown in FIGURE 5. The ram 49 moves in the direction of the arrow in response to the admission of the compressed air to the air cylinder 48, engaging the end of the celery plant 37. This action moves the celery plant laterally a sufficient amount to cause it to fall between the belts 35 and 36. This action is facilitated by the presence of the deflector shield 50, which imparts a clockwise rotation to the celery plant 37 as it is shoved to the left, as shown in FIGURE 5. The mounting of the discharge rams 49 at positions between the pulleys 33 along the length of the conveyor permits the lateral resiliency of the V belts to yield to accommodate the movement of the stalks of celery during the shifting operation shown in FIGURE 5. This minimizes the scuffing action between the belts and the celery plants, with the resilience of the belts in a vertical direction also cooperating to keep the bruising action to a minimum. Since the pulleys 33 are preferably horizontally opposite the pulleys 34, a combined resiliency is provided for the support of the plants of celery at the discharge points.

The equipment for size-sorting the plants of celery is repeated at the successive stations 24–26, with the detector arms 43 being set to be responsive to stalks of celery of progressively decreasing diameter. The last station, indicated at 27 in FIGURES 1 and 2, is intended to receive any stalks of celery not previously sorted out. For this purpose, a laterally-inclined fence as shown at 51 may be used to deflect all passing plants so that they fall off at this point. As an alternative, celery plants remaining on the belts 35 and 36 after station 26 may be accumulated as they fall off the end 72.

Figure 8:
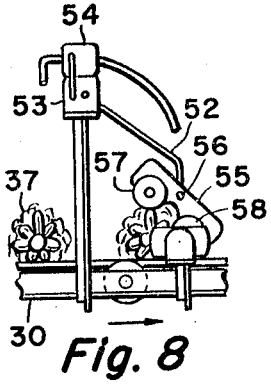
FIGURES 8 and 9 illustrate a modified form of size detector.
Figure 9:
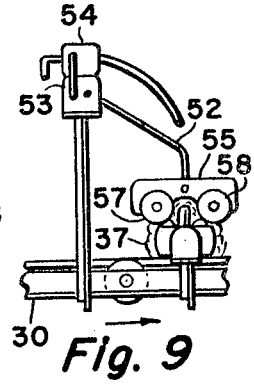

As an alternative to the sorting mechanism shown in FIGURES 6 and 7, the arrangement illustrated in FIGURES 8 and 9 may be used where it is desirable to minimize the possibility that a stray stalk of celery in a particular plant will give an artificial indication of diameter. The detecting arm 52 is pivotally mounted on the switch box 53 to control the solenoid valve 54 in the manner of the arrangement in FIGURES 6 and 7. At the lower extremity of the arm 52, however, a shoe 55 is pivotally connected as shown at 56 to provide a rocking action so that the contacting wheels 57 and 58 can roll over a celery plant to strike a general average of diameter, rather than rely on the false diameter indication given by a single contact point. The successive stages during the passage of a stalk of celery underneath this type of detector are shown in FIGURES 8 and 9. It is also contemplated that celery plants may be compacted under a predetermined loading by a wheel having peripheral rounded recesses, with such a wheel adapted to bear against the plants at the detecting point. This arrangement is not shown, and it requires an accurate spacing of the placement of the stalks of celery along the conveyor, as by the use of a series of spacing projections either on the belts 35 and 36, or by a special conveyor at the loading station which transfers to the belts 35 and 36.

Figure 10:
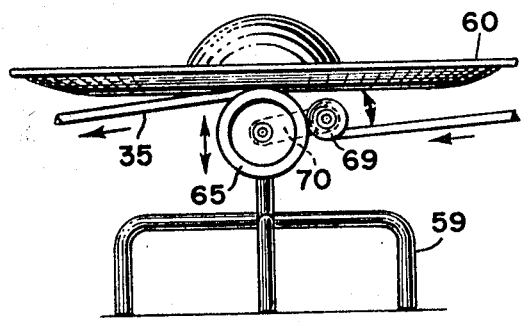
FIGURE 10 is a view on an enlarged scale over that of FIGURES 1 and 2 showing one of the accumulator tables, and the drive associated with it.
Figure 11:
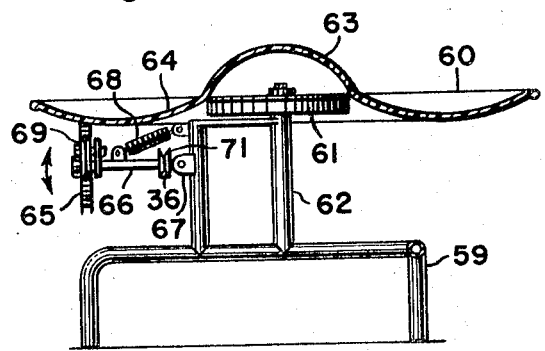
FIGURE 11 is a section on the plane 11—11 of FIGURE 12.
Figure 12:
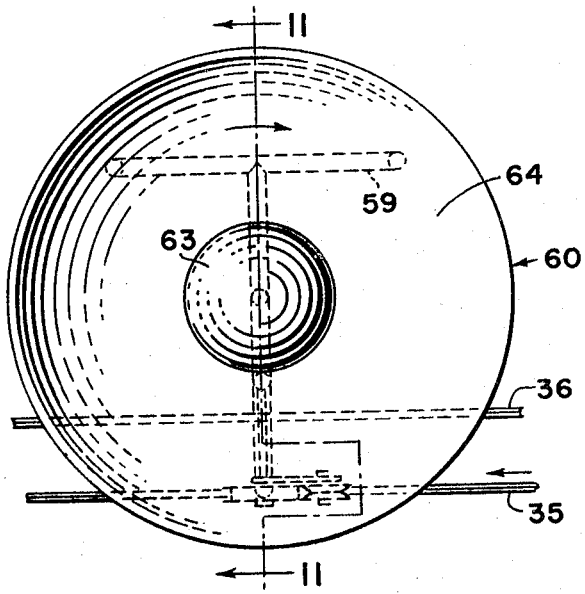
FIGURE 12 is a plan view of the accumulator table shown in FIGURE 10.

After the plants of celery have dropped between the belts 35 and 36 as shown in FIGURE 5, they fall down onto the accumulating tables best shown in FIGURES 10, 11 and 12. These tables are rotatively mounted on a supporting structure 59 so that the dish-shaped table panel 60 rotates on a vertical axis. A convenient type of construction to accomplish this is through the utilization of a mechanism similar to the ordinary automotive wheel hub indicated at 61. This is mounted on a suitable spindle fixed with respect to the post 62, and the periphery of the hub is secured in any convenient fashion to the panel 60. The configuration of the panel 60 has the effect of deflecting celery plants from the central convex portion 63 into the outer concave portion 64. These tables should be rotating continuously in order to induce a relatively even distribution of the celery plants during the operation of the machine. In this manner, a large number of plants that happen to be of approximately the same size can be accumulated so that the packing operator working at that station will have a chance to take the celery plants out of the accumulating table 60 and place them into suitable crates (not shown) without shutting off the entire machine until the particular operator can catch up.

The rotation of the accumulating tables 60 is best accomplished by the arrangement shown in FIGURE 10. The lower course of the belt 35 is caused to engage the pulley 65, which is rotatively mounted in the outer extremity of the arm 66. This arm is pivotally supported on the bracket 67 secured to the supporting structure 59, and a spring 68 urges the pulley 65 in an upward direction to cause the top surface of the belt 35 to bear against the underside of the table panel 60. This action induces the rotation of the table panel. The pulley 69 is mounted on the arm 70 for limited rotation about the arm 66, and the angular position of the arm 70 about the arm 66 may be set to establish a predetermined sector of contact of the belt 35 around the pulley 65. If desired, idler pulleys as shown at 71 may be incorporated at the accumulating stations for support of the return course of the belt 36. Similar idler pulleys may be distributed along the length of the conveyor for the support of both the belts 35 and 36.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited by the prior art.

We claim:

1. A machine for sorting celery, plants and similar articles, said machine comprising:
   conveying means including a pair of spaced belts having the upper courses thereof in horizontally-opposite relationship;
   detector means responsive to the presence of an object of a given size carried by said conveying means;
   discharge means associated with and controlled by said detector means, said discharge means including a laterally movable member adapted to displace an object supported on said belts a predetermined amount selected to cause said object to fall between the said belts;
   accumulator means disposed below said belts to receive said object; and
   drive means for said conveying means.

2. A machine as defined in claim 1, wherein said conveying means includes a fence disposed along one of said belts to determine the placement of objects on said belts.

3. A machine as defined in claim 1, wherein said accumulator means includes a rotary table.

4. A machine as defined in claim 3, wherein said table is driven by one of said belts.

5. A machine as defined in claim 1, wherein at least one of said belts is laterally resilient, and is supported at a point relatively remote from said discharge means, whereby said belt can deflect laterally to accommodate the lateral movement of said object.

6. A machine as defined in claim 1, wherein said detector means includes an arm suspended from a pivotal mounting on a transverse horizontal axis above said conveying means, said arm having a shoe pivotally mounted on a transverse horizontal axis at the lower extremity of said arm, said shoe having spaced engaging members disposed on opposite sides of the pivotal connection of said shoe to said arm.

7. A machine as defined in claim 1, wherein said discharge means includes a deflector shield outside the said belts, and disposed to impart rotation of an object supported by one of said belts as said object is disengaged from the other of said belts through lateral movement, so that said object falls between the said belts.

References Cited

UNITED STATES PATENTS

| 458,061 | 8/1891 | McClendon | 209—73 X |
| 1,872,889 | 8/1932 | Champlin et al. | 209—90 X |
| 1,872,903 | 8/1932 | Cutter | 209—90 X |
| 3,107,788 | 10/1963 | Thiele et al. | 209—88 X |
| 3,237,764 | 3/1966 | Kochalski et al. | 209—88 X |
| 3,329,251 | 7/1967 | Bilocq | 209—74 X |
| 3,368,674 | 2/1968 | Koeppe | 209—88 X |

FOREIGN PATENTS

| 670,279 | 9/1963 | Canada. |

ALLEN N. KNOWLES, Primary Examiner

U.S. Cl. X.R.

209—88, 90